United States Patent [19]

Eilers

[11] Patent Number: 4,556,109

[45] Date of Patent: Dec. 3, 1985

[54] PROCESS FOR CEMENTING GEOTHERMAL WELLS

[75] Inventor: Louis H. Eilers, Inola, Okla.

[73] Assignee: The Dow Chemical Company, Midland, Mich.

[21] Appl. No.: 53,881

[22] Filed: Jul. 2, 1979

[51] Int. Cl.$^4$ .............................................. E21B 33/14
[52] U.S. Cl. .................................... 166/295; 106/105
[58] Field of Search ................ 166/294, 295; 106/105

[56] References Cited

U.S. PATENT DOCUMENTS

| | | | |
|---|---|---|---|
| 2,349,181 | 5/1944 | Lerch | 166/295 |
| 2,773,670 | 12/1956 | Miller | 166/295 X |
| 2,812,161 | 11/1957 | Mayhew | 166/294 X |
| 3,404,735 | 10/1968 | Young et al. | 166/295 |
| 3,662,831 | 5/1972 | Hess | 166/295 |
| 3,850,249 | 11/1974 | Hess | 166/295 |
| 3,919,104 | 11/1975 | Hess | 166/295 X |
| 3,943,084 | 3/1976 | Hess | 166/295 X |
| 4,034,811 | 7/1977 | Sparlin et al. | 166/295 |

FOREIGN PATENT DOCUMENTS 287863  3/1971  U.S.S.R. .............................. 166/294

*Primary Examiner*—George A. Suchfield
*Attorney, Agent, or Firm*—L. Wayne White

[57] ABSTRACT

A pumpable slurry of coal-filled furfuryl alcohol, furfural, and/or a low molecular weight mono- or copolymer thereof containing, preferably, a catalytic amount of a soluble acid catalyst is used to cement a casing in a geothermal well.

1 Claim, No Drawings

PROCESS FOR CEMENTING GEOTHERMAL WELLS

The Government of the United States of America has rights in this invention pursuant to Contract No. DE-AC02-77ET-28324 awarded by the U.S. Energy Research and Development Administration.

BACKGROUND OF THE INVENTION

1. Field of the Invention

This invention pertains to a process and composition for cementing (i.e. sealing or fixing) casing tubing into the borehole of a geothermal well. In the process, the novel slurries are used to fill the annulus between the casing and the wellbore and cured in place to form a tight seal between the casing and the formation and thus preventing communication between fluids in the different zones that the wellbore might traverse.

2. Prior Art

Furan polymers have very desirable chemical and physical properties which have made them the subject of considerable research. Furan polymers are normally obtained by the polymerization of furfuryl alcohol and/or furfural (furfuryl aldehyde). Normally the polymerization is heat activated and acids are catalysts. The polymerization reaction tends to be very exothermic.

Goldstein et al, Ind. Eng. Chem., Vol. 52, No. 1, 57–58 (1960) described the polymerization of furfuryl alcohol in the presence of acidic catalyst. They identified zinc chloride as a preferred catalyst for this polymerization reaction and they also indicated that the catalyzed furfuryl alcohol solution had excellent storage life. The catalyzed solutions were used by Goldstein et al. to impregnate wood, brick, and carbon rods and the like to improve their chemical resistance and physical properties by the in situ formation of the furan polymer.

G. W. Anderson, World Oil, 37–43 (Feb. 1, 1978), used furfuryl alcohol as a one-step plugging agent in several shallow California oil wells which had been stimulated with steam. The furfuryl alcohol penetrated the matrix of these apparently incompetent formations and thermally cured after placement at the bottom hole temperature of 125° F. The "plugged" interval in the formation prevented steam breaking through or channeling of steam around the uncemented casings.

There are various other references which show furfuryl alcohol used in down hole applications. For example: Burtch (U.S. Pat. No. 3,409,079) injected hot inert gases to cure furfuryl alcohol after placement to consolidate incompetent formations. Hess et al, Soc. Petroleum Eng. of AIME, S.P.E. Paper No. 3045 (Oct. 4, 1970) used furfuryl alcohol to plug thief zones in fluid (water, steam, gas) injection wells. They indicated that the material provided a strong durable plug at formation temperatures and had potential for reasonable durability under steam injection conditions where most plugging methods fail. In a later reference (U.S. Pat. No. 3,850,249), Hess described a method for treating a permeable formation or zone adjacent to the bore of an oil well by the injection and setting of an acid-setable liquid using a latent catalyst system. Examples of such acid-setable liquids included monomers such as furfuryl alcohol, furfural, etc., and condensates, such as urea-formaldehyde, phenol-formaldehyde, melamine-formaldehyde, furfuryl alcohol-formaldehyde, furfuryl alcohol-furfural, etc., and mixtures thereof. Hess also used a slurry of sand, furfuryl alcohol and a latent catalyst as a mortar to bond bricks.

Masek, Chem. Abst. 67: 67347v similarly added an acid-resistant, nonalkaline gravel to a catalyzed furfuryl alcohol/furfural system to make a "plastic cement." Other fillers have also been added to make furan polymer "cements." For example, carbon black was used by Maryla et al, Chem. Abst. 79: 79714y, to make a resinous cement in which the curable components were furfuryl alcohol and a phenol-formaldehyde condensate. Carbon black was also utilized by Lerch et al. (U.S. Pat. No. 2,349,181) as a filler in a pumpable liquid resin slurry; the curable components of which included a mixture of furfural and carbon disulfide, phenol, urea, thiourea, thiocresols, thiophenols, or derivatives of these compounds. These slurries were then used as a replacement for the heavier Portland cements to seal or fix casing tubes into a wellbore.

The weight of the cement is important in many instances because the formations are incompetent and this makes the heavy Portland cements difficult to use or inoperable in forming a tight seal. For example, Portland cements are generally unsatisfactory in cementing geothermal wells because such wells are generally produced in a fractured and/or incompetent formation.

Additional problems are encountered in cementing geothermal or geopressure wells because of the elevated temperatures encountered. The bottom hole static temperature (BHST) in such wells typically will range from about 300° to 600° F. A geothermal well is, of course, one which is drilled into a zone capable of producing hot water and/or steam. A geopressure well is one which is drilled into a zone having pressures considerably in excess of the hydrostatic pressure produced by a column of water at that depth. The hot fluids are produced from these formations by artesian forces. Geopressure wells normally do not have a problem of the formation being incompetent but do have the problem with elevated temperatures which adversely effect the properties of normal Portland cement.

SUMMARY OF THE INVENTION

Novel pumpable slurries have now been discovered which are usually suitable for cementing casing tubes into the wellbore of geothermal and geopressure wells. The novel slurries comprise (a) crushed coal and (b) furfuryl alcohol, furfural, and/or a low molecular weight mono- or copolymer thereof.

From a practical standpoint, these novel slurries represent a substantial improvement over the prior art materials. The crushed coal, for example, is much more economical than carbon black as a filler in the slurries and, more importantly, the crushed coal has a higher heat capacity which mitigates the adverse effects of the polymerization exotherm. Further, it is easier to form the slurry from the crushed coal than it is to form a slurry of carbon black. Carbon black has a very high surface area and is difficult to wet with the liquid components. As a result, one can normally form a slurry with crushed coal which is substantially higher in solids content than can be formed using carbon black.

DETAILED DESCRIPTION OF THE INVENTION

The amount and type of coal used in the slurries can be varied to convenience so long as a pumpable slurry is obtained. However, coal whose surface is highly oxidized tends to be acidic and catalyzes the polymerization of furfuryl alcohol and/or furfural. For this reason, some or all of the coal in the slurry preferably is of the type having an oxidized surface. It is also preferred to have the coal in the slurry represent from about 35 to about 60 wt. %, total weight basis, of the slurry.

The crushed coal used in the invention can be of uniform or nonuniform particle size. Crushed coal having a graded mesh (i.e. nonuniform particle size) is presently preferred over coal having a uniform particle size because of economics. The particle size of the crushed coal can vary to convenience so long as a pumpable slurry is achieved. Normally, crushed coal having an average particle size from about 325 mesh to about 20 mesh is preferred.

It is also preferred to include an acid catalyst in the slurries which will promote the polymerization reaction of furfuryl alcohol and/or furfural. Such acid catalysts represent a known class of compounds, as illustrated in the references cited above.

Such catalysts are preferably soluble in furfuryl alcohol and/or furfural and the most preferred catalyst is zinc chloride. Soluble acid releasing catalysts (i.e. latent catalyst), such as those described by Hess, are likewise operable and included under the term acid catalysts. The catalysts are included in the slurries in a catalytic amount. The actual quantity required will vary depending upon the catalysts selected and it is within the skill of the art to easily determine the quantity needed.

Other additives can be included in the slurries, such as polymer stabilizers, antioxidants, etc. and even additional fillers.

The slurries are easily prepared using any mechanical blending device that produces a uniform product. From an operational standpoint, such slurries will normally be prepared at the well site and pumped directly into the annulus of the well. The typical techniques for pumping "cements" into the annulus can be used with the instant class of slurries.

Experimental:

EXAMPLE 1

Furfuryl alcohol (338 grams (g)) and a low molecular weight polymer of furfuryl alcohol (117 g; resin 4607 from Quaker Oats) were added to the bowl of a commercial size Waring Blender. The Waring Blender was turned on for mixing at top speed and coal (400 g) crushed finer than 20 mesh (45 weight percent being finer than 100 mesh) was added along with 1 milliliter (1.57 g) of a 50 percent solution of zinc chloride in water. Mixing was continued for approximately 35 seconds after the addition of coal was complete.

Thickening time of the slurry was determined under the procedures and conditions defined by the API recommended practice for testing oil well cements—API RP 10B, Section 7.

This API test procedure is designed to simulate conditions a cementing material is exposed to while being pumped into place in a wellbore. In this test, the slurry was heated rapidly to 300° F. (149° C.) under a pressure of 3,000 psig (20,700 kilopascals (kp)) and the time necessary for the slurry to reach 100 units of consistency (approximately 100 poises) was recorded; 4 hours, 5 minutes. No apparent exotherm in temperature or pressure build-up was observed during this test. The cured material was a shiny black solid.

The compressive strength was measured using test procedures and conditions set forth in API RP 10B, Section 6. In this test, a slurry prepared under duplicate conditions was cured by heating it for 24 hours at 300° F. under a pressure of 3,000 psig. The compressive strength of the cured sample averaged 1,112.5 psig (7,676 kp).

EXAMPLE 2

Another slurry was prepared in essentially the same manner by blending furfuryl alcohol (100 g), crushed coal (120 g) of the same mesh as Example 1, and zinc chloride (0.26 g dissolved in 0.26 g of water). Samples of this slurry were cured by heating for 24 hours at 300° F. under a pressure of 3,000 psig. Two of the cured test samples were then placed in separate pressure bombs containing water and 3 percent aqueous sodium chloride solution. After 3 days at 300° C. and antogenous pressure, the sample in water had a compressive strength of 2,125 psig (14,660 kp) and a permeability of 0.004 millidarcy. After 7 days and 28 days at 325° C. and antogenous pressure, the samples in the 3 percent brine had compressive strengths of 5,225 psig (36,050 kp) and 4,200 psig (28,980 kp), respectively, and permeabilities of 0.004 and 0.001 millidarcy, respectively.

What is claimed is:

1. In the process of cementing casing tubes into a wellbore of a geothermal or geopressure well by emplacing a curable slurry into the annulus between the casing tube and the wellbore and thereafter permitting the slurry to cure, the improvement comprising using a pumpable slurry comprising (a) crushed coal and (b) furfuryl alcohol, furfural, and/or a low molecular weight mono- or copolymer thereof.

* * * * *